US006944460B2

(12) United States Patent
Haartsen

(10) Patent No.: US 6,944,460 B2
(45) Date of Patent: Sep. 13, 2005

(54) SYSTEM AND METHOD FOR LINK ADAPTATION IN COMMUNICATION SYSTEMS

(75) Inventor: Jacobus Haartsen, Hardenberg (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 633 days.

(21) Appl. No.: 09/876,524

(22) Filed: Jun. 7, 2001

(65) Prior Publication Data

US 2002/0187799 A1 Dec. 12, 2002

(51) Int. Cl.[7] .................................................. H04Q 7/20

(52) U.S. Cl. ................. 455/452.2; 455/450; 455/452.1; 455/348; 455/468; 370/329

(58) Field of Search ........................... 455/452.2, 452.1, 455/450, 348, 468, 509, 522, 69, 34, 504; 370/329, 332, 437, 252, 278, 318

(56) References Cited

U.S. PATENT DOCUMENTS

| | | | | |
|---|---|---|---|---|
| 5,164,959 A | | 11/1992 | Cai et al. | |
| 5,289,459 A | | 2/1994 | Brownlie | |
| 5,430,731 A | | 7/1995 | Umemoto et al. | |
| 5,574,974 A | | 11/1996 | Almgren et al. | |
| 5,724,380 A | | 3/1998 | Ritter | |
| 5,751,767 A | | 5/1998 | Tatsumi | |
| 5,793,976 A | | 8/1998 | Chen et al. | |
| 5,812,522 A | | 9/1998 | Lee et al. | |
| 5,884,181 A | | 3/1999 | Arnold et al. | |
| 5,898,928 A | | 4/1999 | Karlsson et al. | |
| 5,903,819 A | | 5/1999 | Romesburg | |
| 5,970,055 A | | 10/1999 | Park et al. | |
| 5,991,337 A | | 11/1999 | Giles | |
| 6,006,073 A | | 12/1999 | Glauner et al. | |
| 6,044,249 A | | 3/2000 | Chandra et al. | |
| 6,122,293 A | | 9/2000 | Frodigh et al. | |
| 6,134,230 A | | 10/2000 | Olofsson et al. | |
| 6,141,534 A | * | 10/2000 | Snell et al. | 455/12.1 |
| 6,148,023 A | | 11/2000 | Pelin et al. | |
| 6,167,031 A | | 12/2000 | Olofsson et al. | |
| 6,240,077 B1 | * | 5/2001 | Vuong et al. | 370/330 |
| 6,625,466 B1 | * | 9/2003 | Dicker et al. | 455/522 |

FOREIGN PATENT DOCUMENTS

| | | | |
|---|---|---|---|
| WO | WO 00/13362 | A1 | 3/2000 |
| WO | WO 00/44110 | A1 | 6/2001 |

OTHER PUBLICATIONS

Haartsen, J.C., "Bluetooth—The universal radio interface for ad hoc, wireless connectivity", Ericsson Review No. 3, 1998.

* cited by examiner

*Primary Examiner*—Nay Maung
*Assistant Examiner*—Angelica Perez
(74) *Attorney, Agent, or Firm*—Potomac Patent Group PLLC

(57) ABSTRACT

A system, method, and computer program product for allocating resources to a communication channel between a transmitter and a receiver are disclosed. The receiver implements a procedure that instructs the transmitter to utilize the maximum available bandwidth, consistent with maintaining satisfactory communication channel performance. When the performance of the communication channel degrades, the receiver measures the strength of a communication signal received from the transmitter. If the communication signal strength satisfies a threshold, then the bandwidth dedicated to the communication channel may be decreased, and at least one of the number of bits per symbol and coding rate may be increased. By contrast, if the communication signal strength fails to satisfy a threshold, then the transmitter may increase the transmission power and/or reduce the user rate of the communication link.

15 Claims, 6 Drawing Sheets

| | FEC CODING RATE | M BITS/SYMBOL | SIGNAL BAND-WIDTH | NET USER RATE |
|---|---|---|---|---|
| 64-QAM | 1 | 6 | 1/3 W | 2W |
| 64-QAM | 3/4 | 6 | 4/9 W | 2W |
| 16-QAM | 1 | 4 | 1/2 W | 2W |
| 8-PSK | 1 | 3 | 2/3 W | 2W |
| 8-PSK | 3/4 | 3 | 8/9 W | 2W |
| QPSK | 1 | 2 | W | 2W |
| QPSK | 3/4 | 2 | 4/3 W | 2W |
| QPSK | 2/3 | 2 | 3/2 W | 2W |
| QPSK | 1/2 | 2 | 2 W | 2W |
| QPSK | 1/3 | 2 | 3 W | 2W |

FIG. 6

SYSTEM AND METHOD FOR LINK ADAPTATION IN COMMUNICATION SYSTEMS

BACKGROUND

The present invention relates to electronic communication systems, and more particularly to a system and method for adapting parameters of radio links to accommodate changes in the environment of the communication system.

Wireless communication systems transmit communication signals on one or more carrier waves. Many existing radio communication systems use Frequency Division Multiple Access (FDMA) and Time Division Multiple Access (TDMA) channel access techniques. In FDMA access systems, a channel may be defined by one or more radio frequency bands within a given frequency spectrum into which a communication signal's transmission power is concentrated. Interference in FDMA systems may be caused by signals transmitted on adjacent channels (adjacent channel interference) and signals transmitted on the same channel (co-channel interference). Interference from adjacent channels may be limited by the use of band-pass filters that filter out energy outside the specified frequency band.

In TDMA access systems a channel comprises a time slot in a periodic train of time slots of a carrier wave having a given frequency. A given signal's energy is confined to one or more of the designated time slots. These time slots may be organized into groups commonly referred to as frames. Adjacent channel interference may be limited by the use of a time gate or other synchronization element that only passes signal energy received at the proper time. In TDMA access systems, capacity is limited by the available time slots and by limitations imposed by channel reuse.

In Code Division Multiple Access (CDMA) systems, a communication channel is defined by a digital code. In a direct sequence-CDMA (DS-CDMA) spread spectrum transmitter, for example, a digital symbol stream for a given dedicated or common channel at a basic symbol rate is spread to a chip rate. This spreading operation involves applying a channel-unique spreading code, sometimes referred to as a signature sequence, to the symbol stream that increases its rate (bandwidth) and introduces redundancy. The intermediate signal comprising the resulting data sequences (chips) may be added to other similarly processed (i.e., spread) intermediate signals relating to other channels. A base station-unique scrambling code (often referred to as the "long code" since it is in most cases longer than the spreading code) is then applied to the summed intermediate signals to generate an output signal for multi-channel transmission over a communication medium. Multiple intermediate signals may overlap in both the frequency domain and the time domain. A receiver recovers its intermediate signal by correlating the received signal with the appropriate scrambling and spreading codes to despread, or remove the coding from the desired transmitted signal and return to the basic symbol rate. Where the spreading code is applied to other transmitted and received intermediate signals, however, only noise is produced.

Digital communication systems use a variety of linear and non-linear modulation schemes to communicate voice or data information in bursts. These modulation schemes include GMSK, Quadrature Phase Shift Keying (QPSK), Quadrature Amplitude Modulation (QAM), etc. GMSK modulation scheme is a non-linear low-level modulation (LLM) scheme with a symbol rate that supports a specified user bit rate. High-level modulation (HLM) schemes can be used to increase user bit rates. Linear modulation schemes, such as QAM schemes, may have different levels of modulation. For example, 16 QAM scheme is used to represent the sixteen variations of 4 bits of data. On the other hand, a QPSK modulation scheme is used to represent the four variations of 2 bits of data.

In addition to various modulation schemes, digital communication systems can support various channel coding schemes used to increase communication reliability. Channel coding schemes code and interleave data bits of a burst or a sequence of bursts to prevent their loss under degraded RF link conditions, for example, when RF links are exposed to fading. In general, increasing the number of coding bits increases the bit error detection and correction capabilities, but reduces the user bit rate, since coding bits reduce the number of user data bits that can be transmitted in a burst.

Increases in wireless communication has generated a need for additional voice and data channels in cellular telecommunication systems. To accommodate this need, operators of wireless networks have increased the number of base stations in operation. Increasing the number of base stations has reduced the distance between base stations, which creates increased interference between mobile stations operating on the same frequency in neighboring or closely spaced cells.

Link adaptation techniques may be invoked to accommodate increased interference on a communication link. Link adaptation techniques provide the ability to change a communication link protocol, which may be defined by a combination of modulation scheme, channel coding (e.g., FEC coding), and/or the number of used time slots. Dynamic link adaptation methods permit the link protocol to be changed in response to changing channel conditions. Generally, link adaptation methods adapt a system's link protocol to achieve desired performance over a broad range of interference conditions. Exemplary link adaptation schemes are described in U.S. Pat. Nos. 5,574,974; 5,898,928; 6,122,293; 6,134,230; and 6,167,031, which are incorporated by reference herein.

Recently, a radio interface referred to as Bluetooth was introduced to provide wireless, ad hoc networking between mobile phones, laptop computers, headsets, PDAs, and other electronic devices. Some of the implementation details of Bluetooth are disclosed in this application, while a detailed description of the Bluetooth system can be found in "BLUETOOTH—The universal radio interface for ad hoc, wireless connectivity," by J. C. Haartsen, Ericsson Review No. 3, 1998. Further information about the Bluetooth interface is available on the Official Bluetooth Website on the World Wide Web at http://www.bluetooth.org.

Radio communication systems for personal use differ significantly from radio systems like the public mobile phone network. Public mobile phone networks use a licensed band which is fully controlled by the network operator and provides a substantially interference-free channel. By contrast, personal radio communication equipment operates in an unlicensed spectral band and must contend with uncontrolled interference. One such band is the globally-available ISM (Industrial, Scientific, and Medical) band at 2.45 GHz. The band provides 83.5 MHz of radio spectrum. Since the ISM band is open to anyone, radio systems operating in this band must cope with unpredictable sources of interference, such as baby monitors, garage door openers, cordless phones, and microwave ovens. Interference can be reduced using an adaptive scheme that seeks out an unused part of the spectrum. Alternatively, interference can be suppressed by means of spectrum spreading. In the U.S., radios operating in the 2.45 GHz ISM band are required to apply spectrum-spreading techniques if their transmitted power levels exceed about 0 dBm.

Bluetooth radios use a frequency-hop/time-division-duplex (FH/TDD), spread spectrum channel access scheme. In the United States and in most European countries, Bluetooth radios utilize 79 RF channels spaced 1 MHz apart in the 83.5 MHz ISM band. During a connection, radio transceivers "hop" from one frequency band to another in a pseudo-random fashion. The frequency hopping sequence is determined by the device address of a Bluetooth unit. The time dimension is divided into slots of 625 $\mu$s, resulting in a nominal hop rate of 1600 hops/second. Further, slots are used alternately for transmitting and receiving, resulting in a TDD scheme. These features allow for low-cost, low-power, narrowband transceivers with strong immunity to interference.

Generally, the performance of a communication channel is a function of the ratio S/(N+I), where S is the received signal, I is the interference, and N the noise. For radio channels, S is a function of the transmit power and propagation loss on the communication path. Since radio signals propagate omni-directionally, the signal strength declines as function of the distance from the transmitter. Also, the signal may be attenuated by objects blocking the communication path between the transmitter and receiver. In mobile communication systems each of these variables may change over time. The noise N includes thermal noise present in space and thermal noise generated in the electronic circuitry of the receiver. Noise N is normally determined by the bandwidth of the channel and the quality of the receiver, and may vary as function of temperature. The interference I is generated by other radio transmitters in the area and also may vary over time. The interference I can be divided into three components: a co-channel component representing external interference that falls within the channel bandwidth, an adjacent-channel component representing external interference that falls outside the channel bandwidth, and "self-interference" representing interference created by the signal S itself and caused by distortion of the channel.

Link adaptation modifies link parameters to ensure the ratio S/(N+I) remains above an acceptable threshold. In conventional cellular systems, channel planning techniques may be used to reduce interference I from users in the same geographical area. The remaining S/N then determines the link performance. Degradation of the S/N ratio can be reduced by modifying S, for example by implementing suitable power control routines. Public communication systems compatible with the European GSM standard perform this type of link adaptation.

Existing link adaptation techniques were developed for coordinated radio communication systems, in which cell sizes may be adjusted and channel reuse schemes may be implemented to ensure that co-channel interference levels and adjacent channel interference levels are maintained below a maximum level. Because uncoordinated radio systems are unable to control interference levels, the effectiveness of existing link adaptation techniques is limited in uncoordinated radio systems. For example, in an uncoordinated radio system, an interfering transmitter may be much closer to the receiver than the intended transmitter or the transmit power of the interfering transmitter may be much larger than the transmit power of the intended transmitter. In either case, the received signal level may be similar to or smaller than the received interference level. This is usually referred to as the near-far problem. Link adaptation schemes based on changing the coding rate or changing the modulation scheme may be inadequate to address interference caused by the near-far problem. Also, existing link adaptation schemes may affect the net user rate. For example, the channel bandwidth in a GSM system is constant. Increasing the amount of FEC coding or implementing a more robust modulation scheme typically decreases the net user rate.

Accordingly, there remains a need in the art for link adaptation techniques useful in radio systems which incur relatively high interference levels, like those incurred in uncoordinated radio systems. Further, there is a need for link adaptation techniques that attempt to maintain a substantially constant net user rate and bit-error-rate on the communication channel under changing signal and interference conditions.

SUMMARY OF THE INVENTION

The present invention addresses these and other concerns by providing, in one aspect, a system and method for allocating resources to a communication channel between a transmitter and a receiver. According to the invention, communication units may selectively modify the bandwidth, modulation symbol rate, and coding rate of a communication channel to improve the performance of the communication channel and to manage the allocatable frequency spectrum more effectively. Preferably, methods of the present invention may be invoked in uncoordinated radio systems.

In one aspect, the invention provides a method of allocating resources to a communication channel between a transmitter and a receiver. In an exemplary embodiment, the method comprises measuring, at the receiver, a performance parameter of the communication channel. If the performance parameter of the communication channel indicates that the performance of the communication link is satisfactory and the channel bandwidth is less than a maximum allocatable bandwidth, then the channel bandwidth is increased at the transmitter. If the performance parameter of the communication channel indicates that the performance of the communication link is unsatisfactory, then a signal strength indicator of a communication signal from the transmitter is compared to a threshold. If the signal strength indicator of the communication signal at the receiver satisfies the threshold, then the bandwidth allocated to the communication channel between the transmitter and the receiver is decreased. By contrast, if the signal strength indicator of the communication signal at the receiver fails to satisfy the threshold, then either the transmission power is increased or the user rate is reduced.

In another aspect, the invention provides a portable communication device. The device comprises a receiver for receiving a communication signal from a remote radio transmitter over a communication channel and a control unit connected to the receiver. The control unit includes means for measuring a performance parameter of the communication channel; means for generating a signal instructing the remote transmitter to increase the channel bandwidth if the performance parameter of the communication channel indicates that the performance of the communication channel is satisfactory and the channel bandwidth is less than a maximum allocatable bandwidth; means for comparing a signal strength indicator of a communication signal from the remote radio transmitter to a threshold; means for generating a signal instructing the remote transmitter to increase the channel bandwidth if the signal strength indicator of the communication signal from the remote radio transmitter satisfies the threshold; and means for performing at least one of increasing the transmission power or reducing the user rate if the signal strength indicator of the communication signal at the receiver fails to satisfy the threshold.

In yet another aspect, the invention provides a computer program product for allocating resources to a communication channel between a first communication unit and a second communication unit. The computer program product includes a computer-readable storage medium having computer-readable program code means embodied in said medium. The computer-readable program code means includes computer-readable program code means for measuring a performance parameter of the communication channel; computer-readable program code means for generating a signal instructing the remote transmitter to increase the channel bandwidth if the performance parameter of the communication channel indicates that the performance of the communication channel is satisfactory and the channel bandwidth is less than a maximum allocatable bandwidth; computer-readable program code means for comparing a signal strength indicator of a communication signal from the remote radio transmitter to a threshold; computer-readable program code means for generating a signal instructing the remote transmitter to increase the channel bandwidth if the signal strength indicator of the communication signal from the remote radio transmitter satisfies the threshold; and computer-readable program code means for performing at least one of increasing the transmission power or reducing the user rate if the signal strength indicator of the communication signal at the receiver fails to satisfy the threshold. Preferably, the computer program product may be embodied in a radio transceiver.

Advantageously, the present invention enables uncoordinated radio systems to evaluate whether channel degradation may be attributable to noise or co-channel interference before applying a link adaptation scheme. The received signal strength can be monitored using the Received Signal Strength Indication (RSSI) parameter. If the received signal strength drops, then the channel bandwidth may be increased and a modulation scheme and coding scheme are selected that allow the system to operate at lower S/N values. By contrast, if the received signal strength has not dropped, then the channel performance degradation may be attributed to co-channel interference. Accordingly, the signaling rate (and thus the channel bandwidth) may be reduced, the amount of coding may be reduced, and a modulation scheme that can operate at higher S/N values may be selected. Preferably, the invention scheme attempts to keep the user rate constant and the performance of the link as high as possible.

BRIEF DESCRIPTION OF THE DRAWINGS

FIG. 6 is an example of a representative link adaptation table according to the current invention.

DETAILED DESCRIPTION OF THE INVENTION

Existing digital cellular communication networks use an access scheme that combines principles of FDMA/TDMA or FMDA/CDMA. Therefore, the radio spectrum is always separated into a number of frequency bands. The licensed spectrum reserved for the cellular service is divided into multiple radio sub-bands of fixed bandwidth. Multiple channels can be implemented on each frequency sub-band using TDMA or CDMA access techniques. Maintaining a fixed channel bandwidth simplifies hardware design and allows network designers to implement frequency reuse planning techniques to reduce co-channel interference in the network.

Absent significant co-channel interference, link adaptation techniques may be used to reduce problems caused by transmission range and signal fading. For example, if the power level of a received signal decreases due to increased transmission distance or due to fading, link adaptation techniques allow the connection to continue, albeit at a lower S/N value. In these circumstances, the link adaptation scheme may add extra coding bits or change the modulation scheme. However, since the channel bandwidth is limited to the size of the frequency sub-band, adding coding bits or changing the modulation scheme will change the net user rate. For example, adding parity bits to provide extra coding gain will reduce the bandwidth available to carry user information bits. Similarly, implementing a modulation scheme with fewer bits per symbol while maintaining a constant symbol rate requires a decrease in the bandwidth available to carry user information bits. By contrast, if the channel performance increases then a modulation scheme that applies more bits per symbol can be used and/or the number of coding bits can be reduced. However, in a conventional cellular network there is little use in reducing the channel bandwidth even if the desired user rate can be supported by a narrower channel because the bandwidth reduction cannot be exploited to increase the capacity.

This situation is different in uncoordinated radio systems operating in an unlicensed spectrum. In an uncoordinated radio system, interference is uncontrolled, and there are fewer restrictions governing bandwidth allocation within the allocated frequency band. Therefore, bandwidth can be varied to optimize, or at least to improve, the performance of the radio communication channel. In addition, because uncoordinated radio systems do not implement frequency reuse planning, co-channel interference is an important issue. Co-channel interference refers to all interference falling within the allocated channel bandwidth, not only to interference generated by co-users (i.e. users applying the same system).

Figure 1:
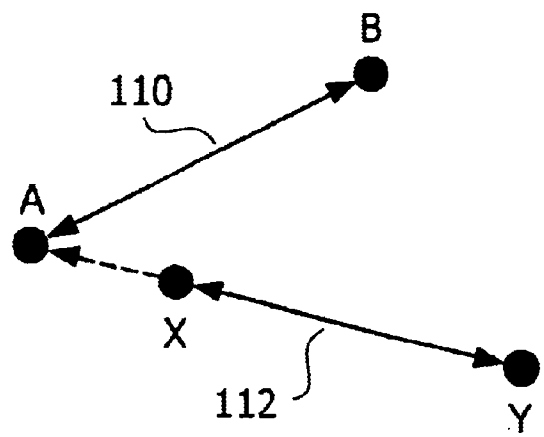
FIG. 1 is a schematic depiction of a topography of co-located ad-hoc radio connections illustrating the near-far problem.

Techniques for reducing interference can be classified as either suppression-based techniques or avoidance-based techniques. Suppression-based techniques for reducing the impact of co-channel interference include coding and direct-sequence spreading. The amount of suppression is a function of the coding gain or the processing gain of the de-spreading process. However, near-far problems may restrict the efficiency of suppression-based techniques, as illustrated in FIG. 1. Referring to FIG. 1, communication units A and B have established a connection, and X and Y have established a connection. Unit X is significantly closer to unit A than unit B is to unit A. In addition, unit X may transmit at a significantly higher power level than unit B. The received interference power in unit A caused by unit X can easily be 50 dB higher than the received power of the intended transmitter, unit B.

In coordinated communication systems, a coordinating unit (e.g., a Base Station Controller) may switch communication units A and B to a frequency different than the frequency used by units X and Y. Alternatively, a coordinating unit may instruct unit X to regulate its power to reduce interference to unit A. By contrast, in an uncoordinated communication system, unit A has no control over the transmission power, channel characteristics, or distance to the interfering unit X. Existing coding or spreading schemes are unable to compensate for interference generating a −50 dB S/I ratio. Therefore, unit A lacks the ability to suppress interference caused by unit X, and the preferred operation of the interfered radio system is to avoid the frequency sub-band occupied by the interfering unit, rather than trying to suppress the interference.

Interference avoidance may be accomplished using either adaptive channel allocation or frequency hopping techniques to avoid interference caused by other applications. Adaptive channel allocation techniques attempt to avoid interference by avoiding frequency spectrum occupied by other applications. Frequency hopping techniques attempt to avoid interference by "hopping" across the allocated frequency spectrum during transmission, so that the transmission occupies only a small segment of the frequency spectrum at a given instant in time. Typically, a higher level protocol resolves contention issues that occur when two units attempt to transmit at the same time on the same frequency. With the avoidance concept offered by frequency hopping or adaptive channel allocation, interference is moved out of the channel and changes from co-channel interference to adjacent-channel interference. Adjacent channel interference can effectively be suppressed by the receive filter. A 50-dB suppression by a filter can be obtained by state-of-the art filter implementations.

Avoidance-based link adaptation techniques, like adaptive channel allocation and frequency hopping, differ fundamentally from suppression-based link adaptation techniques. For example, decreasing the channel bandwidth W increases the effectiveness of avoidance-based link adaptation techniques. Therefore, avoidance-based link adaptation techniques that reduce channel bandwidth W are effective when the S/I ratio decreases, i.e., when channel performance is degraded by interference. However, decreasing the channel bandwidth is not effective when the S/N ratio decreases, i.e., when channel performance is degraded by noise.

The theoretical maximum user rate $R_{max}$ of a channel under Additive White Gaussian Noise (AWGN) conditions was derived by Shannon:

$$R_{max}=W*\log_2(1+S/N) \tag{1}$$

where W is the channel bandwidth. If a flat noise spectrum with a power density $N_0$ is assumed, the noise power is $N_0$*W and $R_{max}$ reduces to:

$$R_{max}=W*\log_2(1+S/(N_0*W)) \tag{2}$$

$R_{max}$ is an theoretical upper bound. In a practical communication network, the net user rate $R<R_{max}$ is determined by:

$$R=m*W*r \tag{3}$$

where m is the number of bits/symbol, W is the channel bandwidth (which is directly determined by the symbol rate), and r is the coding rate defined as the ratio between the bit rate before and after coding. Link adaptation can be executed by varying m, W, or r or a combination thereof. In certain circumstances, it may be advantageous to keep R constant, so the communication channel maintains a constant net user rate. In other circumstances R may be allowed to vary.

Equation 1 teaches that for a constant user rate R, there is a trade-off between the S/N ratio and the bandwidth W. Since the S/N ratio is inversely related to the transmit power a communication link preferably uses the maximum available bandwidth W in order to minimize (or at least to reduce) the transmit power. Reducing the transmit power extends the battery life and reduces interference with other communication links.

In one aspect, a communication unit operating in accordance with the present invention attempts to utilize the maximum available bandwidth consistent with maintaining satisfactory performance on the communication link. In another aspect, when the communication channel's performance degrades, the communication unit attempts to determine whether degradation in the performance of a communication channel is attributable to noise or interference before applying a link adaptation scheme. The signal level may be measured using, e.g., the Received Signal Strength Indication (RSSI). If the communication unit implements a frequency hopping access scheme, the RSSI values measured at different hop channels may be averaged over a predetermined time period. If the measured signal power S is below a threshold, this indicates that degradation in channel performance may be attributable to a reduction in the S/N ratio, and the channel may be considered to be noise-limited. To improve the performance of a noise-limited channel, additional coding or a more robust modulation scheme may be applied. Adding coding or implementing a more robust modulation scheme will require a reduction in the coding rate r and/or the number of bits per symbol m, respectively. If the communication link is operating a the maximum bandwidth $W_{max}$, then either the transmit power $P_{tx}$ must be increased or the user rate R must be decreased.

In an exemplary embodiment, the coding rate r and number of bits per symbol m may be adjusted in the following manner. In a noise-limited channel, the channel bandwidth W preferably is increased to its maximum level. Usually, the number of bits per symbol m can change only in discrete steps, while the coding rate r can be changed at a much higher resolution. Using an illustrative example, assume the number of bits per symbol m take the monotonous increasing values $m_1, m_2, m_3, \ldots m_k, \ldots, m_{max}$ and the system is currently using $m_k$ bits/symbol. When link adaptation is applied to a noise-limited channel, r is reduced until r becomes lower than $m_{k-1}/m_k$, whereupon the number of bits per symbol is changed from $m_k$ to $m_{k-1}$ bits/symbol and the coding rate r is restored to a base value, for example 1. If changing the number of bits per symbol m does not provide satisfactory results, then r is reduced again until it is below $m_{k-1}/m_{k-2}$, whereupon the number of bits per symbol is changed from $m_{k-1}$ to $m_{k-2}$ and r is again restored to a base value, e.g., 1. This process may be iterated until the communication channel satisfies performance requirements.

This link adaptation scheme assumes the transmitter includes separate modulation and coding modules such that the gain in modulation may be obtained by, e.g., an increase in Euclidean distance, and the gain in coding may be obtained by, e.g., an increase in Hamming distance. In a transmitter with coded modulation, the modulation may be fixed at m and the coding rate r would be reduced to obtain coding gain through Euclidean distance. In that case, only the coding rate r changes and the channel bandwidth W is inversely proportional to the coding rate r.

If the measured signal power S is above the required threshold, it is assumed that external interference is responsible for channel performance degradation, and the channel is said to be interference-limited. In an adaptive channel allocation system, the radio spectrum may be scanned to find a suitable sub-band. The probability of success of this search is a function of the channel bandwidth. Reducing the channel bandwidth increases the probability of finding an undisturbed frequency segment. Similarly, in frequency hopping systems, reducing the channel bandwidth increases the number of channels available, which in turn reduces the probability of interference in the allocated frequency spectrum. For a fixed radio spectrum, this means that the hop channel bandwidth decreases.

Figure 2A:
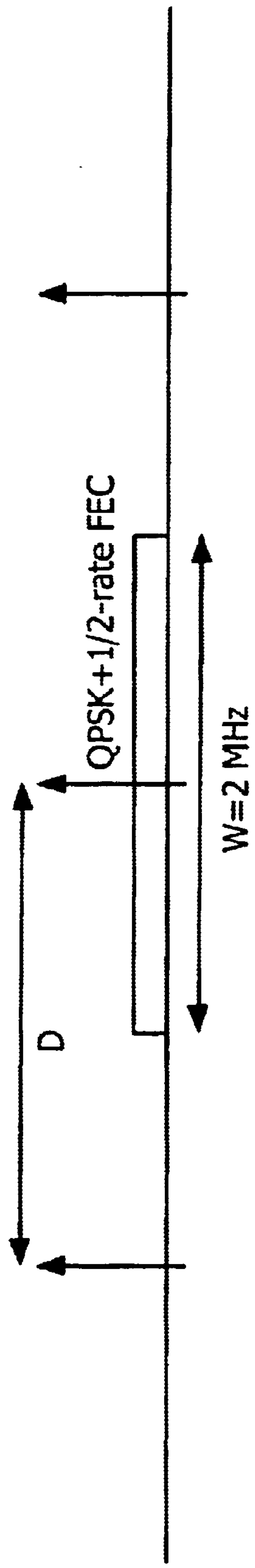
FIGS. 2*a*–2*b* are schematic depictions of channel allocations in a frequency spectrum in accordance with aspects of the present invention.
Figure 2B:
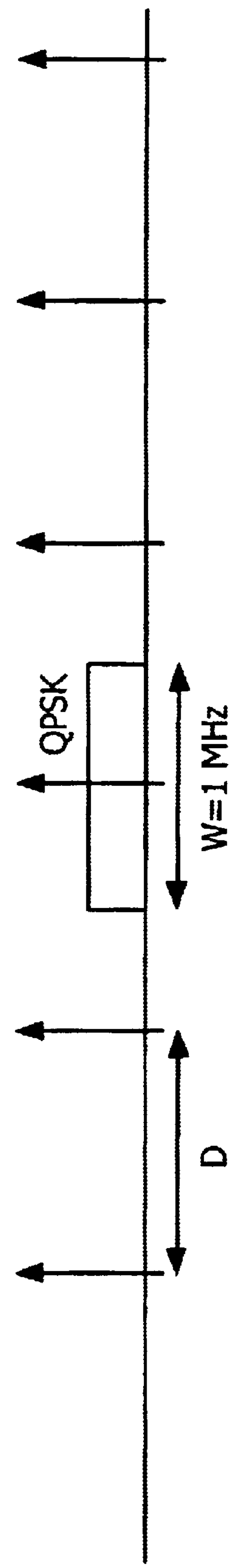

Thus, in one aspect the present invention responds to an interference-limited environment by dividing the allocated radio spectrum into more carriers supporting narrower channels. Referring to FIGS. 2_a_ and 2_b,_ the allocated channel bandwidth W preferably corresponds to the carrier spacing D. FIG. 2_a_ depicts frequency spectrum divided into 2 MHz channels with the center frequency of each carrier separated by approximately 2 MHz. It will be appreciated that frequency guard bands may be allocated between channels. Increasing the number of (non-overlapping) channels increases the probability of finding an interference free channel for adaptive channel allocation systems and reduces the collision probability for frequency hopping systems.

Assuming that the net user rate R is maintained constant, reducing the bandwidth W (i.e., reducing the number of bits per symbol) of the communication channel requires an increase in r (i.e., removing coding bits) and/or m (i.e., applying a more complex modulation scheme). These changes can be made provided the S/N ratio remains sufficient to support the desired net user rate R. If the channel bandwidth W is reduced to a point that causes the S/N ratio to become insufficient to support the desired net user rate R, then the channel changes from being interference-limited to being noise-limited. Removing coding and adding more bits per symbol will require a higher S/N ratio. Reducing the bandwidth W may therefore require an increase in the required signal transmit power.

Figure 5:
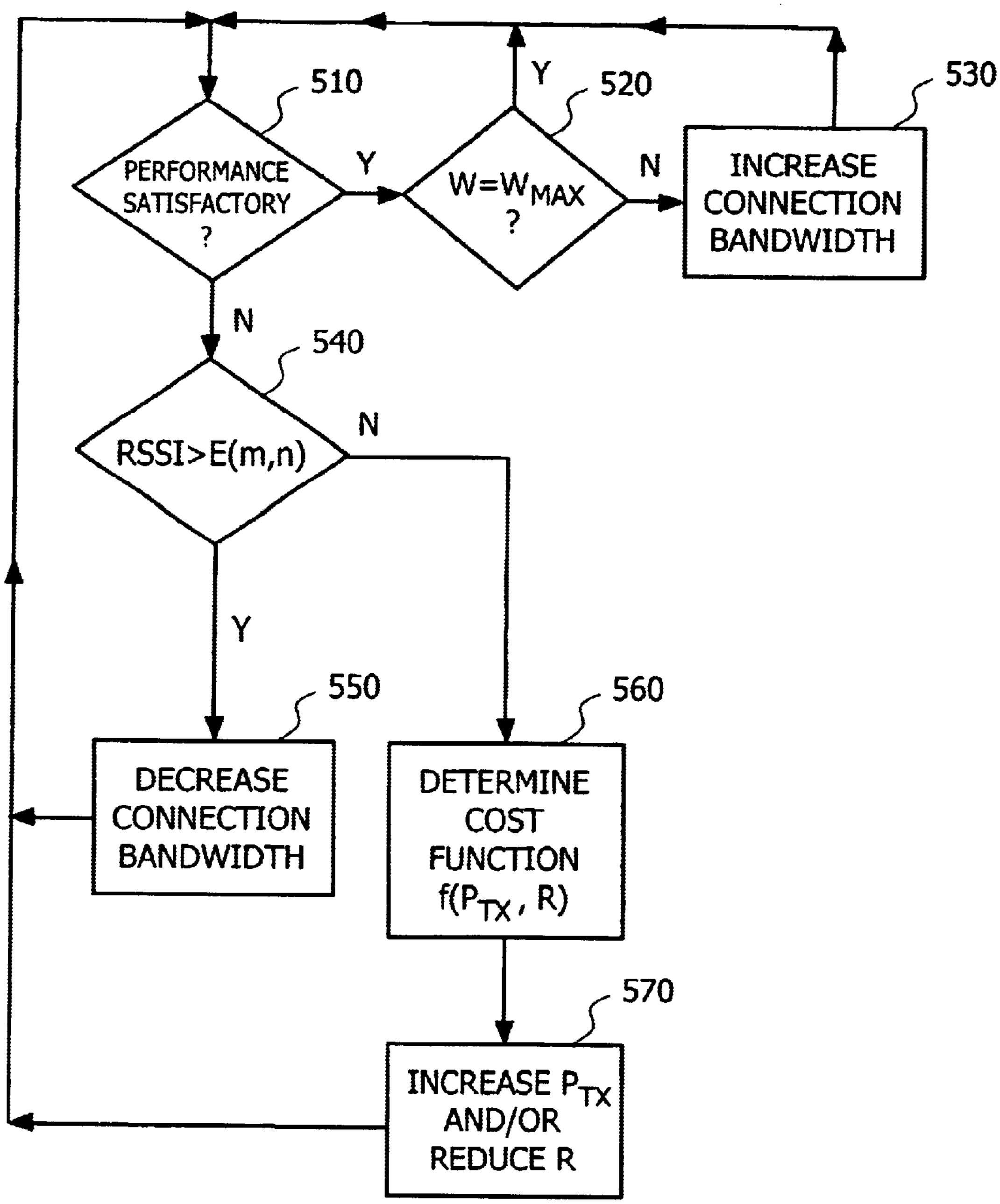
FIG. 5 is a schematic depiction of a flow diagram of link adaptation procedure according to the current invention.

FIG. 5 is a flow diagram illustrating a method of operating a communication unit in accordance with one aspect of the invention. It will be understood that each block of the flowchart, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Referring to FIG. 5, communication link performance is tested at step 510. Link performance may be tested by comparing one or more link parameters against desired performance standards. Exemplary performance parameters presently used in communication systems include, for example, the bit error rate (BER) and the frame error rate (FER); however, it will be appreciated that the present invention need not be limited to these parameters.

If the communication link performance is satisfactory, then at step 520 the current channel bandwidth W is compared to a maximum allocatable bandwidth $W_{max}$. If the communication channel is using the maximum allocatable bandwidth, then control is passed back to step 510. By contrast, if the communication channel is using less than the maximum allocatable bandwidth, then at step 530 the channel bandwidth W is increased, e.g., by decreasing m and/or r. Control may then be passed back to step 510. The routine defined by steps 510–530 ensures that the communication link uses the maximum allocatable bandwidth consistent with maintaining acceptable performance, which allows the transmitter to operate at a lower power level.

By contrast, if at step 510 the link performance is below an acceptable level, then the RSSI is compared to a threshold E(m,r) required for the applied coding and modulation scheme (step 540). If the RSSI is above the threshold E(m,r), then the link degradation is assumed to be caused by interference, and the channel may be characterized as "interference-limited".

If the communication unit uses an adaptive channel allocation scheme or a frequency hopping scheme, then in order to maintain a constant user rate R the communication unit should divide the allocatable radio spectrum into more carriers supporting narrower channels in response to an interference-limited channel, as illustrated in FIG. 2. Reducing the channel bandwidth increases the probability of finding an undisturbed frequency sub-band. Similarly, increasing the number of hop channels reduces the likelihood of interference. If the amount of allocatable radio spectrum is fixed, then increasing the number of hop channels requires reducing the bandwidth allocated to each hop channel. As illustrated in FIG. 2_a_ and FIG. 2_b,_ the bandwidth of each carrier of each carrier preferably corresponds approximately to the carrier spacing D.

Referring to equation 3, assuming the user rate R is kept constant, reducing the bandwidth W (i.e., reducing the number of bits per symbol) will require removing coding bits (i.e., increasing the coding rate r) and/or applying a more robust modulation scheme (i.e., increasing the number of bits per symbol, m). Decreasing the coding bits and increasing the number of bits per symbol will require the communication channel to maintain a higher S/N ratio to support the same net user rate R.

Thus, at step 550, the channel bandwidth W is reduced, and the modulation and/or coding preferably is adapted to maintain a constant user rate R. Control may then be passed back to step 510.

Referring back to step 540, if the RSSI is below the threshold E(m,r), then the link degradation is assumed to be caused by noise, and the channel may be characterized as "noise-limited". In one aspect, the present invention responds to a noise-limited channel by either increasing the transmit power $P_{tx}$ or by decreasing the user rate R. It will be recognized that increasing the transmission power $P_{tx}$ increases the power consumption of the transmitting unit and also increases the level of interference applicable to other communication units. Therefore, transmission power $P_{tx}$ is preferably kept at the minimum level necessary to support a desired user rate R. If the communication session requires a user rate R that cannot be maintained at the current transmission power level, then the transmission power $P_{tx}$ may be increased. At step 560 a cost function may be executed to assess the trade-offs between increasing the transmission power $P_{tx}$ and decreasing the user rate R. The cost function may depend upon the network equipment and the services being offered by the network, and may reflect trade-offs between transmission power and bandwidth. For example, a cost function may be represented by:

$$f=(p_x/p_0)^{\alpha}(R/R_0)^{\beta}$$

where $p_x$ is the transmission power, $p_0$ is a reference transmission power, R is the data rate, $R_0$ is a reference data rate, and $\alpha$ and $\beta$ are weighting functions. In an exemplary system, a communication unit may attempt to maintain the cost function at constant value, e.g., 1. Inclusion of weighting factors $\alpha$ and $\beta$ allows the communication unit to place relatively more or less importance on transmission power or data rate. Increasing $\alpha$ increases the relative importance of transmission power. Similarly, increasing $\beta$ increases the relative importance of that data rate. Advantageously, a communication unit (or a group of communication units) can select parameters to accommodate the network conditions peculiar to the communications session.

Referring again to FIG. 5, at step 570 the transmission power is increased and/or the user rate R is reduced based on the output of the cost function executed at step 560. Control is then passed back to step 510.

The described link adaptation scheme may be used to automatically adjust communication link parameters to provide a desired combination of net user rate, range, capacity, and power dissipation. Advantageously, these parameters can be modified as desired in an uncoordinated communication system because the bandwidth W is variable. For example, if the propagation distance between communication units increases, the transmission power may be increased or the user rate R may be reduced to permit the application of additional coding. Alternatively, if the number of units increases such that mutual interference becomes a problem, then the channel bandwidth may be reduced as desired until the required S/N is lower than can be offered (range limit). In that case, the user rate R may be decreased or the transmit power may be increased. Thus, in contrast to cellular systems where the spectrum is divided into fixed-sized sub-bands, in uncoordinated systems the variation of channel bandwidth can be exploited using the techniques described herein to improve system capacity or link quality.

According to one aspect of the present invention, if a communication unit in an uncoordinated ACA or FH radio system detects a degradation in channel performance, then the communication unit attempts to determine the cause of the performance degradation. For example, a communication unit may measure the signal level of a received signal by determining, e.g., the Received Signal Strength Indication (RSSI). In a frequency hopping system the RSSI values measured at different hop channels may be averaged over a desired time period. If the RSSI level indicates a decrease in received signal power S that exceeds a threshold, then the channel may be characterized as noise-limited.

In response to a noise-limited channel, the communication unit may apply additional error coding or implement a more robust modulation scheme. Applying additional error coding reduces the coding rate r. Similarly, implementing a more robust modulation scheme reduces the number of bits/symbol m. If the communication unit attempts to maintain a constant net user rate R, then reducing r and m will require in an increase in the symbol rate, which will require a corresponding increase in the bandwidth W (see Equation 3). If the bandwidth is already at its maximum, then the transmit power must be increased if the performance remains unsatisfactory.

Assuming the transmitter can adjust independently the modulation (e.g., by varying Euclidean distance) and the gain in coding (e.g., by increasing the Hamming distance), then, in an exemplary embodiment, the coding rate r and the number of bits/symbol m may be adjusted so that the bandwidth W may be increased by an amount sufficient to enable the system to satisfy performance requirements under the detected S/N conditions. In many transmitters the number of bits per symbol m can change only in discrete steps, but the coding r can be changed at a much higher resolution, for example by using punctured convolutional coding. In many transmitters, m can take the monotonous increasing values $m_1, m_2, m_3, \ldots m_k, \ldots, m_{max}$ and the transmitter is currently using $m_k$ bits/symbol. Under these circumstances, r is reduced until r becomes lower than $m_{k-1}/m_k$, at which point the number of bits per symbol is changed from $m_k$ to $m_{k-1}$ bits/symbol and the coding rate r is set to a default value, which may be 1. If the link performance remains unsatisfactory, then r is reduced again until it is below $m_{k-1}/m_{k-2}$. Then the number of bits per symbol is changed from $m_{k-1}$ to $m_{k-2}$ bits/symbol, and the coding rate r is set to a default value, which may be 1. This process may be performed iteratively until the link performance is satisfactory, or until the minimum number of bits per symbol is reached.

By contrast, if a communication unit is unable to adjust independently the modulation and the gain in coding, then the modulation may be fixed at a rate m and the coding rate r may be reduced. Under these conditions, only the coding rate r changes and the channel bandwidth W is inversely proportional to the coding rate. Alternatively, the coding rate r may be fixed and the modulation may be changed to increase (or decrease) the channel bandwidth W.

Figure 3:
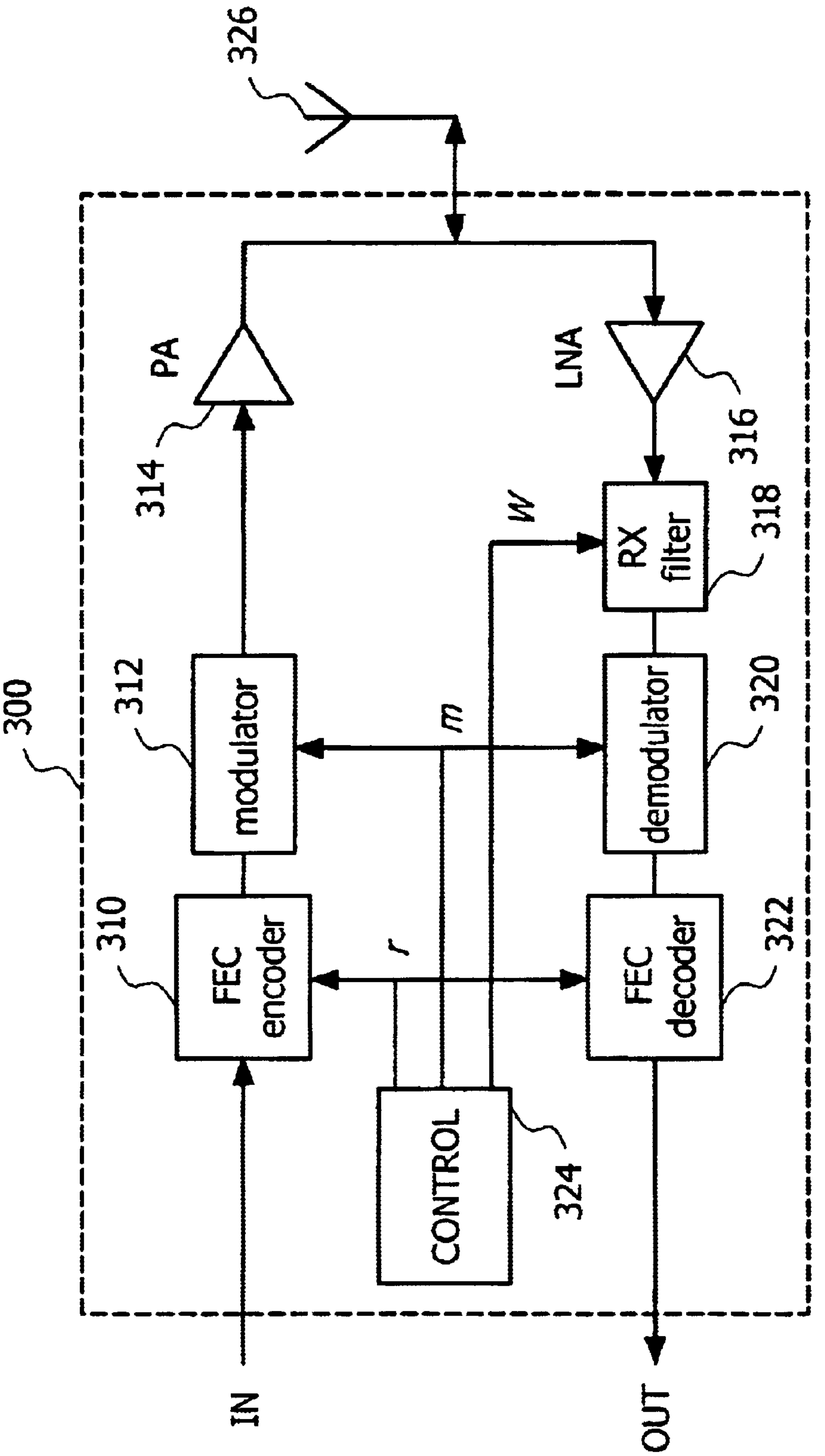
FIG. 3 is a schematic depiction of a transceiver adapted to apply the avoidance link adaptation scheme according to the current invention.

FIG. 3 is a schematic block diagram of a radio transceiver 300 adapted to apply a link adaptation scheme according to the present invention. The transmit section consists of a forward error correction (FEC) coding unit 310 capable of varying the coding rate r, and a modulation unit 312 in which a modulation scheme can be selected with m bits/symbol. The output of modulation unit 312 is amplified by an amplifier unit 314 before being supplied to an antenna unit 326 for transmission.

The receiver section of radio transceiver 300 has a filter unit 318 where the receive filter bandwidth W can be changed, a demodulation unit 320 that can adapt to the applied modulation, and a FEC decoding part 322 which can adapt to the applied coding. The receive bandwidth W is adjusted to the TX bandwidth which may be determined by the coding and modulation scheme.

The radio transceiver 300 may be of substantially conventional design, and includes a control unit 324 for implementing a link adaptation scheme in accordance with the present invention, e.g., as described in connection with FIG. 5. Control unit 324 measures the link performance and the strength of a received signal (e.g., the RSSI), and calculates a desired coding rate r and a desired number of bits per symbol m. This information may be transmitted to the transmitter section of a radio transceiver in communication with transceiver 300 to allow the transmitter to modify its coding rate r and modulation scheme as described above. This transmission may be affected explicitly, e.g., by transmitting over a control channel or on another separate communication channel. Control unit 324 also applies the coding rate r to the receiver's FEC decoder 322 and the number of bits per symbol m to the demodulator 320.

Alternatively, control unit 324 can rely on the reciprocity of the channel between transceiver 300 and another transceiver, and can modify the coding rate r to the FEC encoder 310 and the number of bits per symbol m to the modulator 312 in its transmitter section based on the receiver settings. Control unit 324 also calculates a desired number of bits per symbol m, which may be applied to the modulator 312 and the demodulator 320. In addition, control unit 324 calculates a desired channel bandwidth W, which is applied to the receive filter 318.

The table in FIG. 6 illustrates an exemplary link adaptation procedure in accordance with the present invention. In a purely interference-limited situation (top row) the communication channel may operate with 64-QAM modulation and an FEC coding rate, r=1. If the signal strength is inadequate (e.g., if RSSI<E(m,r)) then the channel is assumed to be noise-limited, and the control unit 324 reduces the FEC coding rate from 1 to ¾ to expand the channel bandwidth from ⅓ W to 4/9 W. If the communication channel remains noise-limited, then the control unit 324 may change the modulation scheme from 64-QAM to 16-QAM and may reset the FEC coding rate to 1, which expands the channel bandwidth from 4/9 W to ½ W. The remaining rows illustrate exemplary changes in the modulation scheme, FEC coding rate r, and number of bits per symbol m, that the control unit 324 may implement to expand the channel bandwidth to compensate for a noise-limited channel. In this example, it is assumed that the coding rate r can vary between the values 1, ¾, ⅔, ½, and ⅓. The number of bits per symbol m can vary between 2, 3, 4 and 6. This corresponds to, for example, QPSY, 8-PSIC, 16-QAM, and 64-QAM, respectively. The channel bandwidth ranges from ⅓ W in the pure interference-limited case, to 3 W in the noise-limited case. The net user rate is fixed at 2 M bits/s.

Figure 4A:
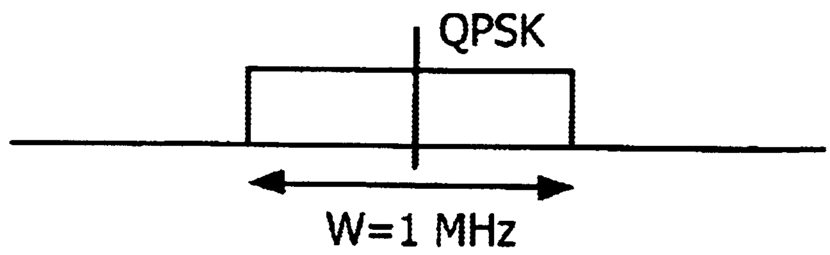
FIG. 4*a* is a schematic depiction of a reference frequency spectrum before link adaptation (QPSK)
Figure 4B:
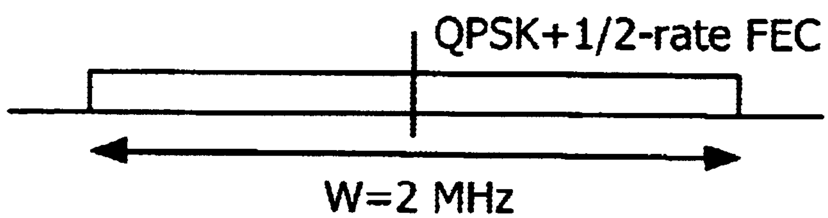
FIG. 4*b* is a schematic depiction of the frequency spectrum of FIG. 4*a* in which link adaptation has been applied to increase the bandwidth of the noise-limited communication channel (½-rate QPSK)

FIG. 4 is a schematic illustration of changes to a channel's bandwidth to compensate for noise or interference. FIG. 4*a* illustrates the channel bandwidth before link adaptation is shown. By way of example, the channel may initially apply QPSK modulation with a symbol rate of 1 Mb/s and a channel bandwidth of 1 MHz. If the channel is determined to be noise-limited, then the channel bandwidth is expanded as illustrated in FIG. 4*b*. By way of example, the channel bandwidth may be expanded to 2 MHz, and a QPSK modulation scheme that provides 2 bits per symbol may be applied. In the reference signal, no FEC coding is assumed. When the received signal power drops, FEC coding bits are added. The coding gain should compensate for the decrease of the signal level. In order to keep the net user rate at 2 Mb/s, the symbol rate is increased to 2 Ms/s, and the channel bandwidth becomes 2 MHz. As the signal bandwidth broadens, the power density (W/Hz) may be decreased to maintain a constant total transmit power. Expanding the bandwidth is always preferable, since it will allow the link to operate at a lower transmit power.

Figure 4C:
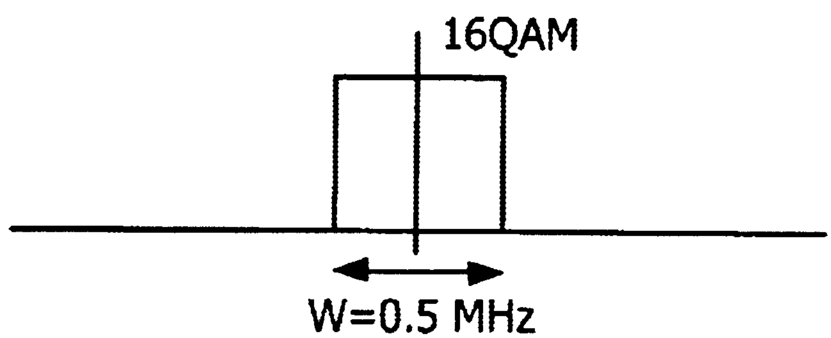
FIG. 4*c* is a schematic depiction of the frequency spectrum of FIG. 4*a* in which link adaptation has been applied to decrease the bandwidth of an interference-limited communication channel (16-QAM)

By contrast, if degradation in the communication channel is due to interference, then the channel bandwidth may be reduced by, e.g., reducing the symbol rate from 1 Ms/s to 0.5 Ms/s, which is illustrated in FIG. 4*c*. Contemporaneously, the modulation scheme may be changed from QPSK to 16-QAM to provide 4 bits per symbol thus keeping the net user rate at 2 Mb/s. The power density may be increased such that the total transmit power remains constant. The units that broaden the spectrum occupies more bandwidth and thus produces more interference, but the power density decreases which compensates for some of the increase in interference, especially for distant units. In contrast, units that reduce their channel bandwidth will occupy less bandwidth, but will increase the power density.

The described link adaptation scheme automatically adjusts the system to provide net user rate, range, and capacity. These three system parameters can be exchanged provided the bandwidth W is variable. If the propagation distance increases, the bandwidth is increased until the reception becomes interference-limited or the maximum bandwidth W has been reached. If this boundary is hit, the user rate R is reduced to further allow the addition of coding or the transmit power must be increased. If the number of units increases such that mutual interference becomes a problem, the channel bandwidth may be reduced. This may require an increase in the transmit power or a reduction in the user rate R. In contrast to cellular systems where the spectrum is divided into fixed-sized sub-bands, in uncoordinated systems the variation of channel bandwidth can be exploited to optimize capacity.

The present invention has been described with reference to particular embodiments. It will be understood that the claims are not limited to the particular embodiments described herein, but should be construed to cover structural equivalents and modifications consistent with the ordinary skill in the art. In addition, it should be emphasized that the term "comprises/comprising" when used in this specification is taken to specify the presence of stated features, integers, steps, or components but does not preclude the presence or addition of one or more other features, integers, steps, components, or groups thereof.

What is claimed is:

1. A method of allocating resources to a communication channel between a transmitter and a receiver, comprising the steps of:

(a) at the receiver, measuring a performance parameter of the communication channel;

(b) if the performance parameter of the communication channel indicates that the performance of the communication link is satisfactory and the channel bandwidth is less than a maximum allocatable bandwidth, then increasing the channel bandwidth at the transmitter;

c) if the performance parameter of the communication channel indicates that the performance of the communication link is unsatisfactory, then comparing, in the receiver, a signal strength indicator of a communication signal from the transmitter to a threshold;

(d) if the signal strength indicator of the communication signal at the receiver satisfies the threshold, then decreasing the bandwidth allocated to the communication channel between the transmitter and the receiver; and (e) if the signal strength indicator of the communication signal at the receiver fails to satisfy the threshold, then performing at least one of increasing the transmission power or reducing the user rate.

2. A method according to claim 1, wherein the signal strength indicator is the RSSI.

3. A method according to claim 1, wherein the step of increasing the bandwidth allocated to the communication channel comprises decreasing the coding rate applied to a communication signal at the transmitter.

4. A method according to claim 1, wherein the step of increasing the bandwidth allocated to the communication channel comprises decreasing the number of bits per symbol applied during modulation of a communication signal at the transmitter.

5. A method according to claim 1, wherein the step of decreasing the bandwidth allocated to the communication channel comprises increasing the coding rate applied to a communication signal at the transmitter.

6. A method according to claim 1, wherein the step of decreasing the bandwidth allocated to the communication channel further comprises increasing the number of bits per symbol applied during modulation of a communication signal at the transmitter.

7. A method according to claim 1, wherein the step of increasing the bandwidth allocated to the communication channel comprises decreasing the transmission power.

8. A portable communication device, comprising:

a receiver for receiving a communication signal from a remote radio transmitter over a communication channel;

a control unit connected to the receiver and including:

(a) means for measuring a performance parameter of the communication channel;

(b) means for generating a signal instructing the remote transmitter to increase the channel bandwidth if the performance parameter of the communication channel indicates that the performance of the communication channel is satisfactory and the channel bandwidth is less than a maximum allocatable bandwidth;

(c) means for comparing a signal strength indicator of a communication signal from the remote radio transmitter to a threshold;

(d) means for generating a signal instructing the remote transmitter to decrease the channel bandwidth if the signal strength indicator of the communication signal from the remote radio transmitter satisfies the threshold; and (e) means for performing at least one of increasing the transmission power or reducing the user rate if the signal strength indicator of the communication signal at the receiver fails to satisfy the threshold.

9. A portable communication device according to claim 8, wherein the signal strength indicator is the RSSI.

10. A portable communication device according to claim 8, wherein the means for generating a signal instructing the remote transmitter to increase the channel bandwidth generates a signal instructing the remote transmitter to decrease the coding rate applied to a communication signal.

11. A portable communication device according to claim 8, wherein the means for generating a signal instructing the remote transmitter to increase the channel bandwidth generates a signal instructing the remote transmitter to decrease the number of bits per symbol applied during modulation of a communication signal.

12. A portable communication device according to claim 8, wherein the means for generating a signal instructing the remote transmitter to decrease the channel bandwidth generates a signal instructing the remote transmitter to increase the coding rate applied to a communication signal.

13. A portable communication device according to claim 8, wherein the means for generating a signal instructing the remote transmitter to decrease the channel bandwidth generates a signal instructing the remote transmitter to increase the number of bits per symbol applied during modulation of a communication signal.

14. A portable communication device according to claim 8, wherein the means for generating a signal instructing the remote transmitter to increase the channel bandwidth generates a signal instructing the remote transmitter to decrease the transmission power.

15. A computer program product for allocating resources to a communication channel between a transmitter and a receiver, comprising:

computer-readable storage medium having computer-readable program code means embodied in said medium, said computer-readable program code means including:

computer-readable program code means for measuring a performance parameter of the communication channel;

computer-readable program code means for generating a signal instructing the remote transmitter to increase the channel bandwidth if the performance parameter of the communication channel indicates that the performance of the communication channel is satisfactory and the channel bandwidth is less than a maximum allocatable bandwidth;

computer-readable program code means for comparing a signal strength indicator of a communication signal from the remote radio transmitter to a threshold;

computer-readable program code means for generating a signal instructing the remote transmitter to decrease the channel bandwidth if the signal strength indicator of the communication signal from the remote radio transmitter satisfies the threshold; and computer-readable program code means for performing at least one of increasing the transmission power or reducing the user rate if the signal strength indicator of the communication signal at the receiver fails to satisfy the threshold.

* * * * *